Oct. 7, 1958  P. J. DUKES  2,854,735
TOOL HOLDER
Filed Sept. 22, 1954  2 Sheets-Sheet 1
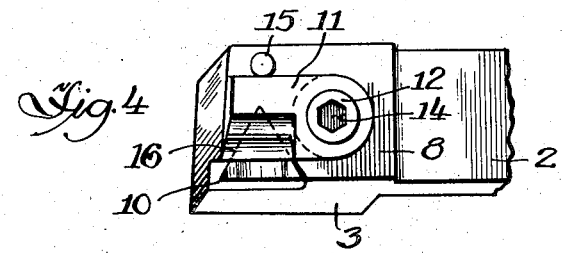
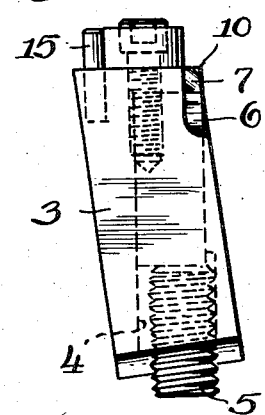
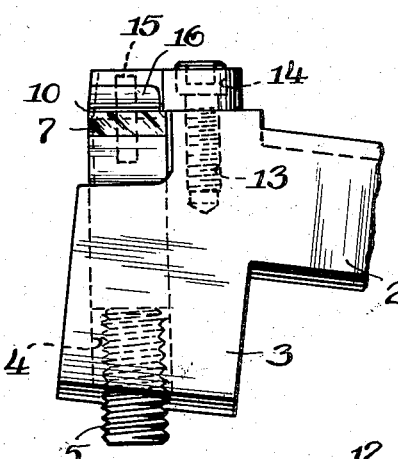
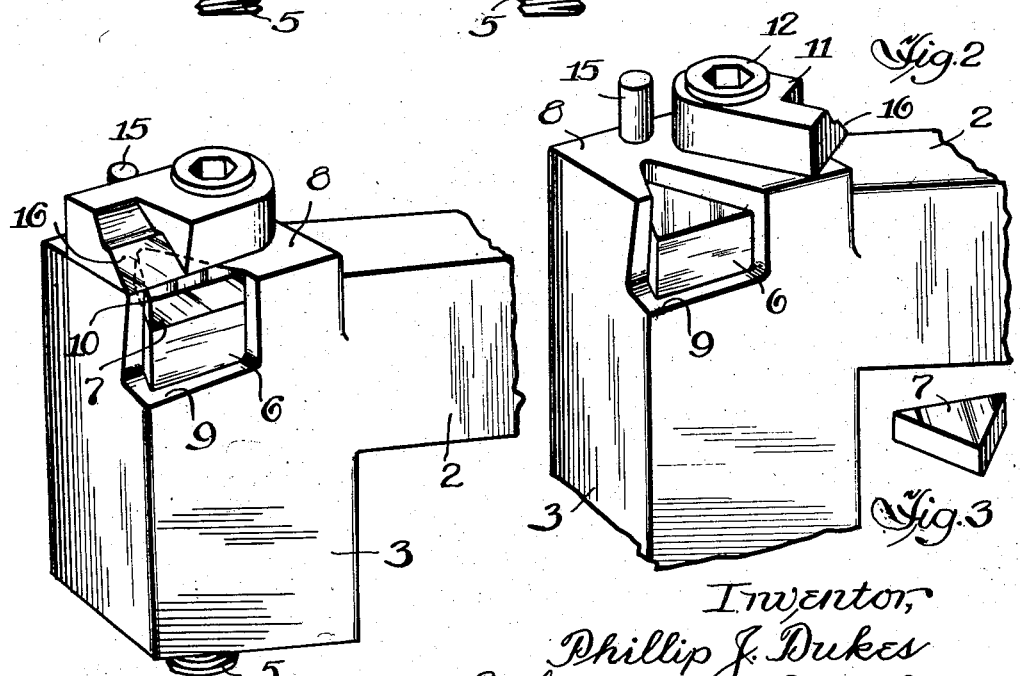
Inventor,
Phillip J. Dukes
By: Schneider & Dressler,
Attys.

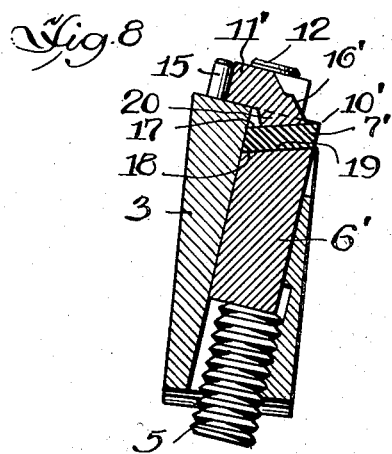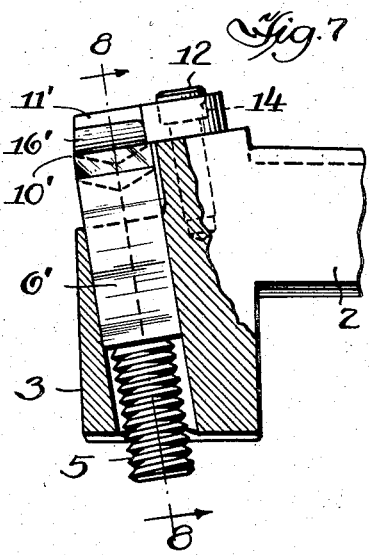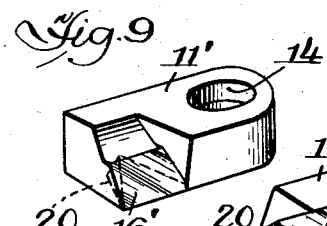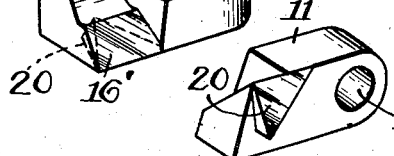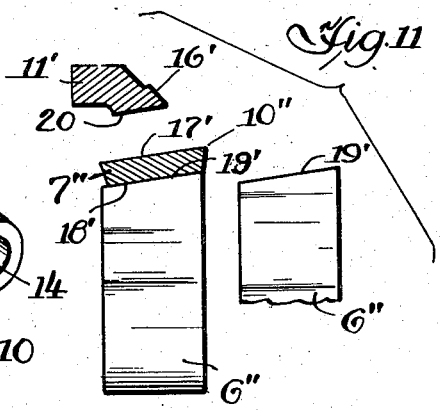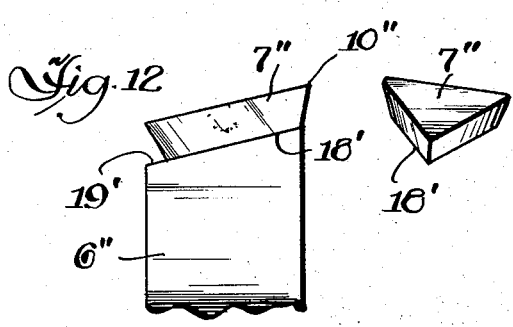

United States Patent Office 2,854,735
Patented Oct. 7, 1958

2,854,735
TOOL HOLDER

Phillip J. Dukes, Waukegan, Ill., assignor to Vascoloy-Ramet Corporation, a corporation of Delaware Application September 22, 1954, Serial No. 457,729

2 Claims. (Cl. 29—96)

This invention relates to a tool holder for use on metal working machines, and is particularly concerned with means for facilitating the insertion and proper location of removable cutting elements used in such tool holders.

It is essential, in most metal cutting operations, that the cutting edge of the cutting element remain in the same position relative to the work piece centerline throughout the cutting operation in order to hold size and effect maximum machinability. When a cutting edge becomes worn the cutting element or insert must be taken out of the holder and reinserted in the holder with a different cutting edge in operative position, or replaced by a new cutting element. The tool holder of the present invention permits the removal and replacement, either of the same element with a different cutting edge in operative position, or of a new cutting element, so that the cutting operation may be continued with a minimum of delay. The new cutting edge will be automatically positioned in the same position relative to the work piece centerline as the position of the worn cutting edge.

The tool holder herein described has a hold down plate that normally overlies a portion of the opening in which the cutting element is positioned. The hold down plate may readily be swung to one side to clear the cutting element so that it may be removed and replaced, and then swung back into position and tightened with the new cutting edge in the same relative position as the old.

In most metal cutting operations it has been found desirable to present the cutting edge of the cutting element to the work at an angle to the work to provide proper clearance. The preferred angle is that described as a 7° negative back rake, 7° negative side rake, because such negative rakes cause the line of force exerted by the work to lie within the confines of the cutting element, thereby strengthening it against the severity of service. In order to eliminate the necessity of grinding clearance angles on the side of the inserts, the tool holder itself has been shaped to provide the preferred angularity so that a cutting element having its sides and ends at right angles to each other will normally be presented to the work at the desired angle when it is positioned in the tool holder.

In machining cast iron and nonferrous metals, these negative rake tools are not particularly effective, and tools having neutral back and side rakes, or even positive rakes, are preferred because of their beneficial effect upon surface finish, cutting tool life, and reduction in cutting pressure.

I have found that tool holders for use under circumstances where the 7° negative rakes are objectionable can be arranged to provide neutral rakes, or any desired positive or negative rake, by providing cutting element with faces arranged angularly, relative to their sides, to compensate for the angularity of the tool holder. For example, if a neutral back rake and neutral side rake is desired, the cutting element is ground 7° on the sides and ends. The top surface of the follower block is ground to conform to the desired angularity, and the hold down plate is provided on its underside with a surface or pad also having the desired angularity. The surface or pad serves also as a locating member to help position the cutting element in the tool holder so that it may be removed and replaced without readjustment of the tool holder, just as in the case of the cutting elements having their faces at right angles to their sides.

It is also contemplated in accordance with the present invention to provide a locating surface or pad for angular cutting elements on a fixed hold down plate, so that similar advantages in locating the cutting element may be obtained with tool holders in which the hold down plate must be removed to replace the cutting element, or in which the follower block and screw are removed to replace the cutting element.

The hold down plate of my improved tool holder cooperates with a follower block and screw to permit the use of extremely thin cutting elements or flakes with the same accuracy as cutting elements of conventional length.

The structure by which the above and other advantages of the invention are attained will be described in the following specification, taken in conjunction with the accompanying drawings, showing two preferred illustrative embodiments of the invention, in which:

Figure 1 is a perspective view of a tool holder head embodying the invention, with a portion of the shank broken away;

Fig. 2 is a fragmentary perspective view of the tool holder head of Fig. 1 with the hold down plate swung away and the cutting element removed;

Fig. 3 is a detail perspective view of the cutting element removed from Fig. 2;

Fig. 4 is a top plan view of the tool holder;

Fig. 5 is an end elevational view;

Fig. 6 is a side elevational view;

Fig. 7 is a side view, partly in section and partly in elevation, of a different embodiment of tool holder assembly;

Fig. 8 is a cross sectional view, taken along the line 8—8 of Fig. 7;

Fig. 9 is a detail perspective view of the swingable hold down plate;

Fig. 10 is a detail perspective view of the bottom of the hold down plate of Fig. 9;

Fig. 11 is a diagrammatic view of the follower, hold down plate, and another embodiment of cutting element showing the angular relationship between the cutting element, follower block, and pad on the bottom of the hold down plate;

Fig. 12 is a diagrammatic view of the follower and cutting element; and

Fig. 13 is a detail perspective view of the cutting element of Fig. 11.

Referring to the drawings, the tool holder comprises a shank 2 of any desired shape and size and a head 3 extending angularly in a general vertical direction at one end of the shank. Head 3 is provided with a longitudinal opening 4 extending angularly therethrough in a general vertical direction. Opening 4 may have any desired cross sectional configuration, but a triangular cross section is shown. The lower portions of the side walls of the opening are threaded to receive a screw 5 which may be rotated to elevate a follower block 6 positioned in the opening. Follower block 6 is preferably of the same cross sectional configuration as the opening. The length of the follower block depends upon the length of the cutting element 7 which is positioned in opening 4 on top of the follower block. The cutting element 7 of the same cross sectional configuration as opening 4, and its lower surface is parallel to the top surface of the follower block so that it is supported firmly over its entire bottom area.

In use, the top surface of cutting element 7 is parallel to the top surface 8 of head 3. The upper portions of the front and one adjacent wall of head 3 are cut away, as indicated at 9, to provide a transverse opening communicating with longitudinal opening 4 to expose the cutting edge 10 of cutting element 7 and to provide side clearance during the cutting operation. The angularity of head 3 and longitudinal opening 4 relative to shank 2 are such that when the shank is clamped into position on the machine on which the tool holder is used, cutting edge 10 is in the same horizontal plane as the top edge of shank 2. If the edges of the cutting element are at right angles to the ends it will have a 7° negative back rake, 7° negative side rake, when the shank is clamped into position.

A hold down plate 11 is pivoted to the top of head 3 by a bolt 12 which extends through a counterbored opening 14 in plate 11 and is threaded into a recess 13. A locating element or pin 15 projects upwardly from the top surface 8 of head 3 to limit the pivotal movement of plate 11 and to stop it in a predetermined position. Plate 11 is provided with a chip breaker 16 which is positioned properly with respect to the cutting edge 10 when plate 11 abuts locating pin 15. In this position plate 11 overlies a portion of opening 4 so that it may abut the top end of a cutting element positioned in the opening.

When screw 12 is loosened the hold down plate may be swung to the position of Fig. 2. After cutting element 7 is positioned in opening 4 on top of follower block 6 the hold down plate is swung around until it abuts locating pin 15, and screw 12 is then tightened. If the cutting element positioned in the opening is of different length from the cutting element previously used, any necessary adjustment may be made by screw 5 so that the newly inserted cutting element may be tightly held between the top of the follower block and the bottom of the hold down plate. If the same cutting element is removed and either reversed or rotated through an angle to present a new cutting edge, the locating pin 15 will insure the same relationship between the chip breaker and cutting edge, so that when the cutting element is tightened in place the cutting edge will be in the same position relative to the workpiece centerline without readjustment and the chip breaker will function in the same manner as before removal of the cutting element. If the cutting elements used are flakes of uniform thickness it is possible to insert a new cutting element without readjustment of screw 5. These flakes are used until the cutting edges on both ends are worn, and are then discarded because it is less expensive to replace one with a new flake than to regrind it.

In Figures 7 to 10 I have shown another embodiment of the invention in which the ends of the cutting element are at an angle to the sides to provide side clearance. In this embodiment the head and shank of the tool holder are the same as previously described and the same reference numerals will be used to designate identical parts. Screw 5 is also the same as in the first embodiment. The only structural differences are in the follower 6', cutting element 7', and hold down plate 11'.

The ends 17 and 18 of cutting element 7' are ground at a positive angle of 7° from back to front and ap osi- tive angle of 7° from one side to the other, relative to the sides of the cutting element, with both ends 17 and 18 of the cutting element parallel to each other. This angularity provides necessary side clearance, and cooperates with the angularity of the top surface of the follower block and the bottom surface of pad 20, hereinafter described, to compensate for the angularity of the tool holder, so that when the tool holder is clamped to the machine on which it is used, the cutting edge 10' will be presented to the work at a neutral angle. If a positive rake, say of 3°, is desired, the faces of the cutting element would be ground at 10° instead of 7° and the angularity of the top surface of the follower block and the bottom surface of pad 20 correspondingly changed.

The top surface 19 of follower block 6' is parallel to surface 18 so that it will provide a firm support for the entire bottom surface of the cutting element, as in the first embodiment. The cutting element may be rotated to present a new cutting edge, or may be reversed to make the cutting edges on the other end of the cutting element available. However, if a cutting element having different rakes is to be used, the top surface of the follower block must be ground to conform to the new angularity, or must be replaced by a follower block having the desired angularity.

The hold down plate 11' differs from the plate 11 of the first embodiment only in that it has a pad 20 projecting from its bottom at an angle conforming to the angle of top end 17 of the cutting element so that it engages top 17 in face to face relationship when cutting element 7' is in position in the tool holder head and screw 12 is tightened. Pad 20 may be integral with plate 11' or may be welded or brazed thereto. Instead of having a pad projecting from the bottom of plate 11' as a locating element, the bottom surface of the plate may be ground to provide a surface of the desired angularity. In this event the cutting edge of the insert would extend above the top surface 8 of the head, but the insert would still be held tightly between the top of the follower block and the bottom of the hold down plate. Pad 20 cooperates with locating pin 15 to insure proper positioning of cutting element 7'. Hold down plate 11' operates in the same manner as plate 11 except that screw 12 must be loosened to a slightly greater extent with plate 11' to permit pad 20 to clear the top surface of head 3 when it is swung away from holding position to permit removal and replacement of the cutting element. If the cutting element is rotated or reversed to present a new cutting edge, or is replaced by a cutting element of the same thickness and angularity, the new cutting edge will be positioned in exactly the same relationship to the work as the old cutting edge, without any readjustment when plate 11' is swung back against locating pin 15 and screw 12 is tightened to bring pad 20 into engagement with the top of the cutting element.

In Figs. 11 to 13 I have shown a different embodiment of the cutting element 7" which is ground to provide a specific rake and clearance for an individual job. As in the embodiment of Figs. 7 to 10, the top surface 19' of the follower block 6" has an angularity conforming to the angularity of the bottom surface 18' of the cutting element. This type of cutting element may be used with the tool holder of Figs. 7 to 11 in the same manner as cutting element 7' except that the cutting edges 10" on the top only may be used. In other words, the cutting element may be indexed through angles 60° to use all three cutting edges on the top of the cutting element, but the cutting element cannot be reversed to use the bottom.

While I have described three preferred embodiments of my invention in considerable detail, it will be understood that the description thereof is intended to be illustrative, rather than restrictive, as many details of the structure may be modified or changed without departing from the spirit or scope of the invention. Accordingly, I do not desire to be restricted to the exact construction described.

I claim:

1. In combination, a tool holder comprising a head having a longitudinal opening, a follower block in said opening, said block having an angularly disposed top surface, a cutting element seated on said block, the top and bottom ends of said cutting element being parallel to each other and to the top surface of said block, a hold down plate pivotally mounted on the top of said head to swing over said opening and clear of said opening, a chip breaker rigidly secured to said plate, said chip breaker being positioned in predetermined position relative to said cutting element when said plate overlies said opening, a pad depending from said plate, said pad having a bottom disposed at an angle parallel to the angle of said follower block and cutting element, the bottom of said pad engaging the top end of said cutting element when said plate overlies said opening and means to tighten said hold down plate against the top surface of said head, whereby said cutting element is firmly held between said pad and said follower block.

2. In combination, a tool holder comprising a head having a longitudinal opening, a follower block in said opening, said block having an angularly disposed top surface, a cutting element seated on said block, the top and bottom ends of said cutting element being parallel to each other and to the top surface of said block, means holding said block against movement away from said cutting element, a hold down plate pivoted to the top of said head to swing over said opening and clear of said opening, a chip breaker rigidly secured to said plate, said chip breaker being positioned in predetermined position relative to said cutting element when said plate overlies said opening, a pad depending from said plate, said pad having a bottom disposed at an angle parallel to the angle of said follower block and cutting element, the bottom of said pad engaging the top end of said cutting element when said plate overlies said opening, a locating pin projecting from the top of said head to engage said plate to facilitate positioning it with said pad in engagement with said cutting element, and means to tighten said hold down plate against the top of said head, whereby said cutting element is firmly held between said pad and said follower block.

References Cited in the file of this patent

UNITED STATES PATENTS

| | | |
|---|---|---|
| 2,628,415 | Brown | Feb. 17, 1953 |
| 2,688,179 | Greenleaf | Sept. 7, 1954 |
| 2,697,272 | Clark | Dec. 21, 1954 |
| 2,787,823 | Kennicott | Apr. 9, 1957 |

OTHER REFERENCES

Toolholder Catalog VR-435, Jan. 4, 1954, published by Vascoloy-Ramet Corp. of Waukegan, Ill.